(12) United States Patent
Branover et al.

(10) Patent No.: US 12,181,944 B2
(45) Date of Patent: Dec. 31, 2024

(54) METHOD AND APPARATUS FOR MANAGING POWER STATES

(71) Applicant: Advanced Micro Devices, Inc., Santa Clara, CA (US)

(72) Inventors: Alexander J. Branover, Boxborough, MA (US); Thomas J. Gibney, Boxborough, MA (US); Stephen V. Kosonocky, Fort Collins, CO (US); Mihir Shaileshbhai Doctor, Santa Clara, CA (US); John P. Petry, San Diego, CA (US); Indrani Paul, Austin, TX (US); Benjamin Tsien, Santa Clara, CA (US); Christopher T. Weaver, Boxborough, MA (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 0 days.

(21) Appl. No.: 17/562,854

(22) Filed: Dec. 27, 2021

(65) Prior Publication Data

US 2023/0205297 A1 Jun. 29, 2023

(51) Int. Cl.
*G06F 1/3206* (2019.01)
(52) U.S. Cl.
CPC ................ *G06F 1/3206* (2013.01)

(58) Field of Classification Search
CPC ........................ G06F 1/3206
See application file for complete search history.

(56) References Cited

U.S. PATENT DOCUMENTS

| | | | |
|---|---|---|---|
| 2011/0035611 A1 | 2/2011 | Brey et al. | |
| 2013/0262902 A1* | 10/2013 | Herdrich | G06F 1/3293 713/323 |
| 2016/0179177 A1* | 6/2016 | Henry | G06F 13/36 713/320 |
| 2017/0068707 A1 | 3/2017 | Noyes et al. | |
| 2018/0129604 A1 | 5/2018 | Kim et al. | |
| 2019/0155770 A1 | 5/2019 | Kumar et al. | |
| 2021/0124594 A1* | 4/2021 | Rajagopal | G06F 9/4405 |

FOREIGN PATENT DOCUMENTS

JP 2004-140503 A 5/2004

\* cited by examiner

*Primary Examiner* — Gary Collins
(74) *Attorney, Agent, or Firm* — Volpe Koenig

(57) ABSTRACT

A method and apparatus for managing power states in a computer system includes, responsive to an event received by a processor, powering up a first circuitry. Responsive to the event not being serviceable by the first circuitry, powering up at least a second circuitry of the computer system to service the event.

17 Claims, 7 Drawing Sheets

METHOD AND APPARATUS FOR MANAGING POWER STATES

BACKGROUND

During a power saving mode in a system on chip (SOC) computer system, as different power off modes are entered, various portions of the chip are shut down. When an SOC that has multiple power states is in a powered-down mode, a wake-up signal is sent to power the system back up. In some systems, the entire system, or a large portion of the system, is awakened in response to such a signal. The remainder of that system, however, may determine a subsequent power state to enter into. This technique, however, consumes power to determine which power state to enter into.

BRIEF DESCRIPTION OF THE DRAWINGS

A more detailed understanding can be had from the following description, given by way of example in conjunction with the accompanying drawings wherein.

DETAILED DESCRIPTION

Although the method and apparatus will be expanded upon in further detail below, briefly a method for managing power states is described herein. For example, in a system on chip (SOC) computer system, in order to effect power savings, some areas associated with the SOC may be powered down for power savings. Although described in additional detail below, an SOC is a device where many components of an entire system are resident on a chip. For example, an SOC may include a processor, memory, storage, input and output drivers, and other components on a single chip.

When the SOC is powered down into a sufficiently low power state and subsequently processes a command to enter into a higher power state, the SOC enters into an intermediate power state. In this intermediate power state, the SOC is capable of determining with some precision what further power state to enter into. The SOC can determine to change into any of a variety of states, including a lower power state, such as a state in which only a display controller is powered up, or a higher power state, such as a state in which additional components of the SOC are powered up.

A method for managing power states in a computer system includes, responsive to an event received by a processor, powering up a first circuitry. Responsive to the event not being serviceable by the first circuitry, powering up at least a second circuitry of the computer system to service the event.

An apparatus for managing power states in a computer system includes a first circuitry, a second circuitry, and a processor operatively coupled with and in communication with the first circuitry and the second circuitry. The processor is configured to, responsive to an event received power up the first circuitry. Responsive to the event not being serviceable by the first circuitry, processor powers up the second circuitry of the computer system to service the event.

A processor for managing power states in a computer system includes the processor configured to, responsive to an event received, power up a first circuitry of the computer system operatively coupled with and in communication with the processor. Responsive to the event not being serviceable by the first circuitry, the processor powers up a second circuitry of the computer system operatively coupled with and in communication with the processor to service the event.

Figure 1:
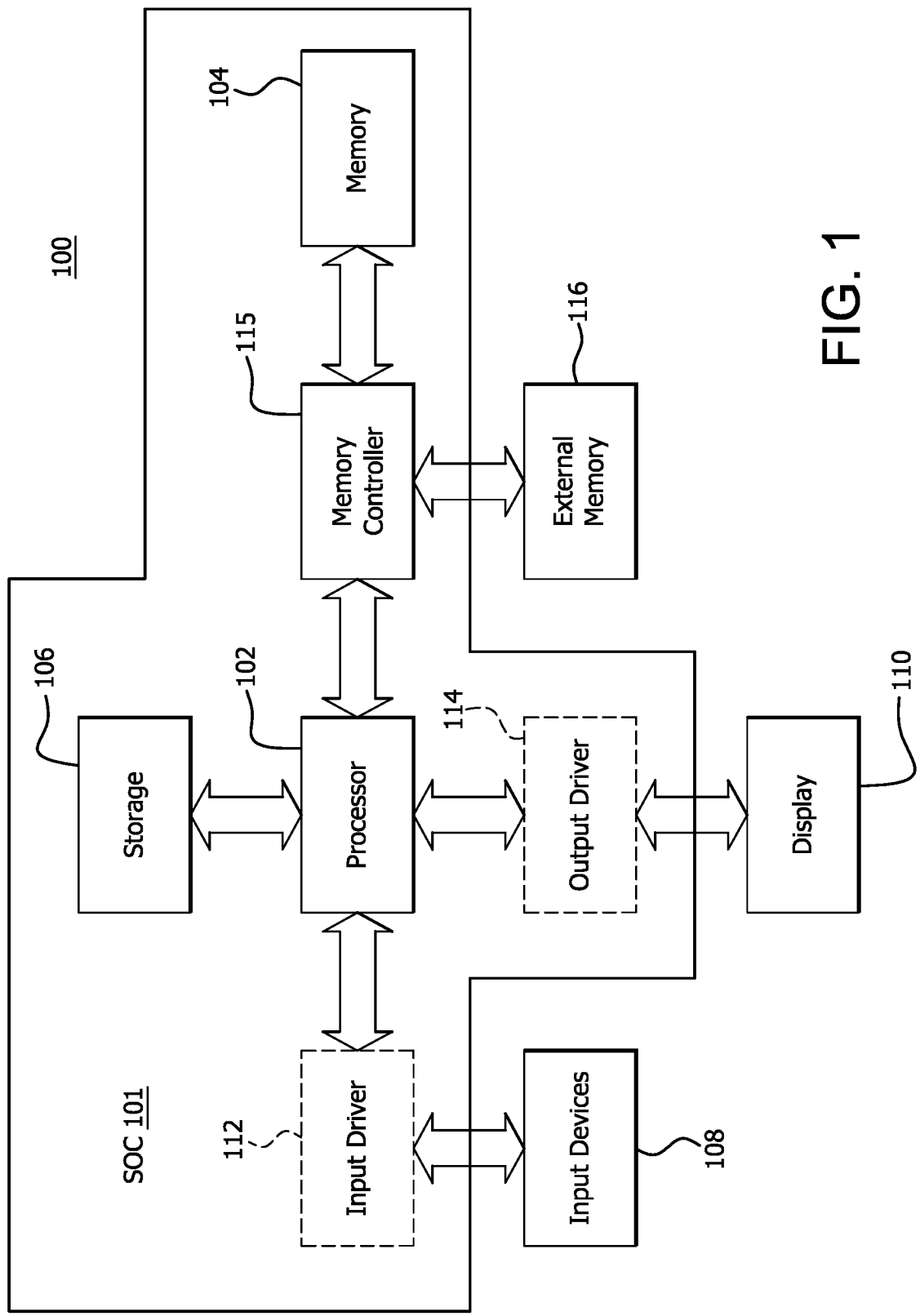
FIG. 1 is a block diagram of an example device in which one or more features of the disclosure can be implemented.

FIG. 1 is a block diagram of an example device 100 in which one or more features of the disclosure can be implemented. The device 100 can include, for example, a computer, a server, a gaming device, a handheld device, a set-top box, a television, a mobile phone, or a tablet computer. The device 100 includes a processor 102, a memory 104, a storage 106, one or more input devices 108, and one or more output devices 110. For purposes of example, the output device 110 is shown as being a display 110, however, it is understood that other output devices could be included.

The device 100 can also optionally include an input driver 112 and an output driver 114. Additionally, the device 100 includes a memory controller 115 that communicates with the processor 102 and the memory 104, and also can communicate with an external memory 116. In some embodiments, memory controller 115 will be included within processor 102 It is understood that the device 100 can include additional components not shown in FIG. 1.

As discussed above, the processor 102, memory 104, storage 106, input driver 112, output driver 114 and memory controller 115 may be included on an SOC 101.

In various alternatives, the processor 102 includes a central processing unit (CPU), a graphics processing unit (GPU), a CPU and GPU located on the same die, or one or more processor cores, wherein each processor core can be a CPU or a GPU. In various alternatives, the memory 104 is located on the same die as the processor 102, or is located separately from the processor 102. The memory 104 includes a volatile or non-volatile memory, for example, random access memory (RAM), dynamic RAM, or a cache.

The storage 106 includes a fixed or removable storage, for example, a hard disk drive, a solid state drive, an optical disk, or a flash drive. The input devices 108 include, without limitation, a keyboard, a keypad, a touch screen, a touch pad, a detector, a microphone, an accelerometer, a gyroscope, a biometric scanner, or a network connection (e.g., a wireless local area network card for transmission and/or reception of wireless IEEE 802 signals). The output devices 110 include, without limitation, a display, a speaker, a printer, a haptic feedback device, one or more lights, an antenna, or a network connection (e.g., a wireless local area network card for transmission and/or reception of wireless IEEE 802 signals).

The input driver 112 communicates with the processor 102 and the input devices 108, and permits the processor 102 to receive input from the input devices 108. The output driver 114 communicates with the processor 102 and the output devices 110, and permits the processor 102 to send output to the output devices 110. It is noted that the input driver 112 and the output driver 114 are optional components, and that the device 100 will operate in the same manner if the input driver 112 and the output driver 114 are not present.

The external memory 116 may be similar to the memory 104, and may reside in the form of off-chip memory. Additionally, the external memory may be memory resident in a server where the memory controller 115 communicates over a network interface to access the external memory 116.

There is a benefit to powering down different regions in the system. By powering down regions, it is possible to effect power savings by only operating and powering circuitry that is utilized in a particular power down state. Areas that are needed in order to service an event can then be awakened and powered up, thus using only the amount of power necessary to service the event and not resulting in excess power usage.

Figure 2A:
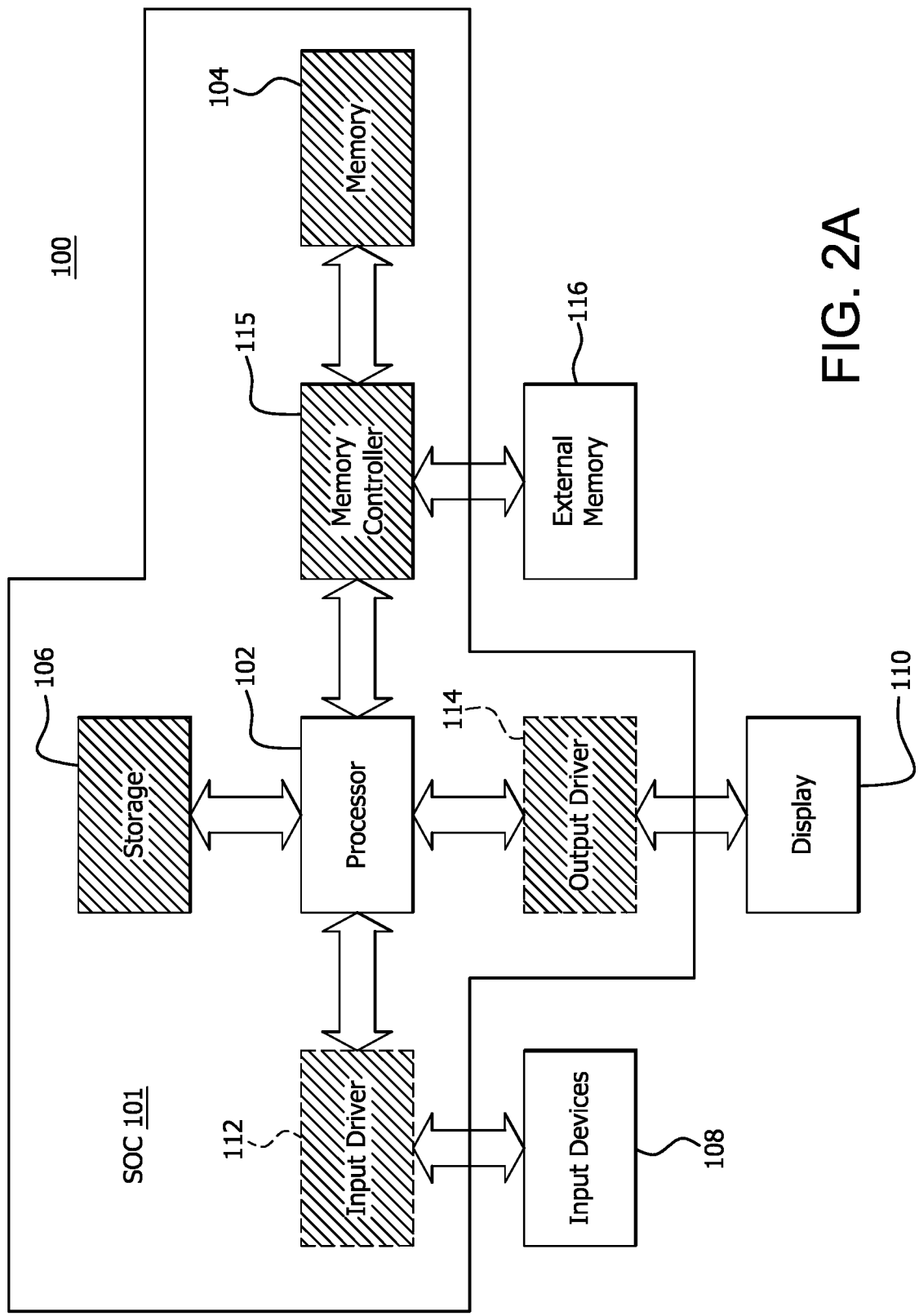
FIG. 2A is a block diagram of the example system of FIG. 1 in a partially powered down state.

FIG. 2A is a block diagram of the example system of FIG. 1 in a partially powered down state. The example system 100 in FIG. 2A shows the SOC 101 in a partially powered down state where several components are powered down for power savings.

For example, in FIG. 2A, the memory 104, storage 106, input driver 112, output driver 114, and memory controller 115 are powered down. The processor 102 in SOC 101 is shown as being powered up. In an embodiment where the processor 102 is a GPU, the processor 102 may also be powered down.

In this state, power savings are effected by circuitry associated with components that are not needed to operate being powered down. Power can therefore be utilized by areas that are active and operating. For example, the video controller, display controller and GPU may be powered down during a sleep mode of the system.

Figure 2B:
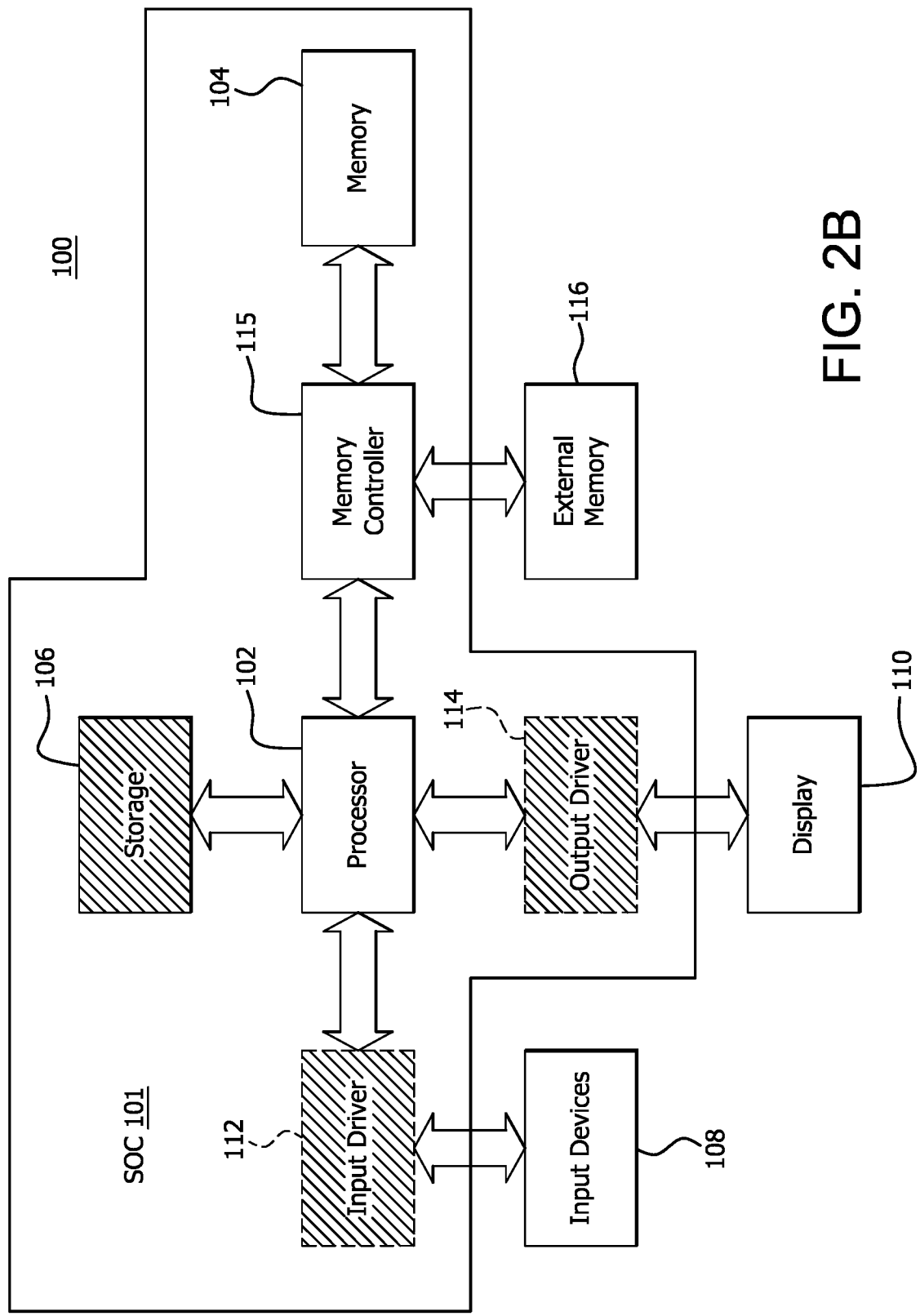
FIG. 2B is a block diagram of the example system of FIG. 1 in a second partially powered down state.

FIG. 2B is a block diagram of the example system of FIG. 1 in a second partially powered down state. The example system 100 in FIG. 2B shows that storage 106, input driver 112 and the output driver 114 are powered down. In this state, the processor 102, memory controller 115 and memory 104 are awakened to service an event to be serviced.

In FIG. 2B, a limited wakeup has occurred that utilizes the memory controller 115 wakeup, a more detailed wakeup for which will be described in more detail below. By waking up the memory controller 115, memory operations to memory 104 and external memory 116 may be effected. For example, if a wakeup event that requires a read or write to a memory is received by the SOC 101, the memory controller 115 and the memory 104 are awakened.

Figure 2C:
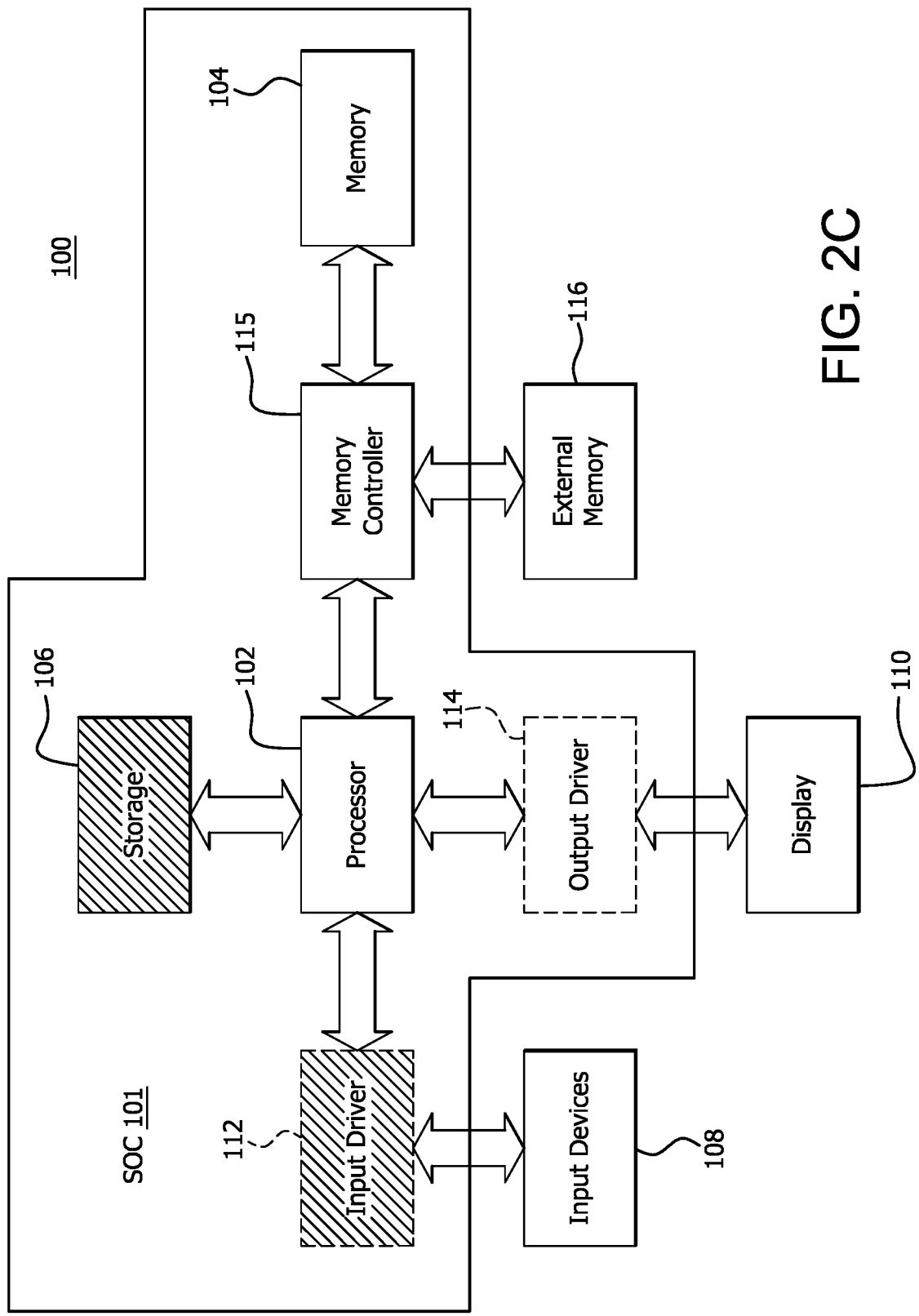
FIG. 2C is a block diagram of the example system of FIG. 1 in a third partially powered down state.

FIG. 2C is a block diagram of the example system of FIG. 1 in a third partially powered down state. The example system 100 in FIG. 2C shows that storage 106, input driver 112 and the output driver 114 are powered down. In this state, the processor 102, output driver 114, memory controller 115 and memory 104 are awakened to service a wake-up event.

In this state, it is determined that the event to be serviced requires additional components to those of FIGS. 2A and 2B to service an event received by the SOC 101.

For example, an event that is received that requires both the memory controller 115 and a display controller may warrant the awakening of the memory controller 115, memory 104 and the output driver 114.

Collectively, the wakeups occurring in FIGS. 2A, 2B and 2C may be referred to as horizontal wakeups. That is, the components being awakened in the SOC 101 are horizontally associated and one or more components to be awakened to service an event without waking additional components.

For example, the memory controller 115 may be awakened to service a memory read or write, without needing to awaken the output driver 114 when a render to the display is not required.

In a horizontal wakeup, the event received by the SOC 101 determines what components of the SOC 101 need to be awakened. The determination may be made by the processor 102 of the SOC 101 or by any other SOC HW or FW component by examining the event received and determining what horizontal components of the SOC 101 are to be awakened.

Again, the processor 102 may first awaken a limited portion of the SOC 101. Additional SOC 101 components may be awakened if the type or the duration of the event to be serviced requires additional components be awakened.

For example, the wake-up events may include user-triggered events (e.g., a mouse move, keyboard click) or timer-event. Additionally, an incoming WiFi event, PCIe event or GPIO (General Purpose IO) associated with an ACPI event may trigger a wakeup. These events may require the waking up of additional components from the SOC 101.

A mouse move or keyboard click, for example, may require the waking up of the input driver and input circuitry in the SOC 101. An incoming WiFi event, PCIe event, or GPIO event may require the waking up of circuitry relating to the transmission of data along the buses that may be used to transmit that data.

Figure 3A:
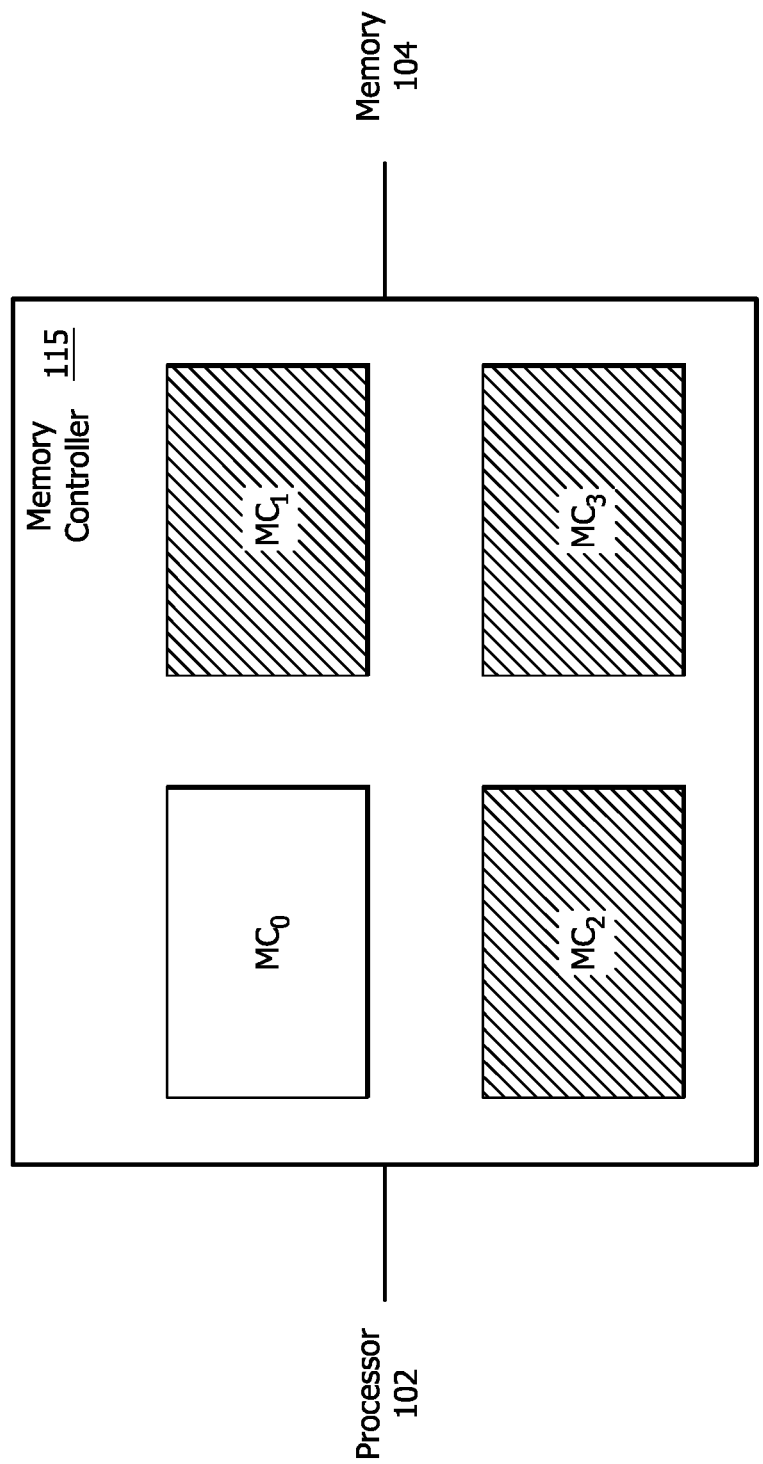
FIG. 3A is a block diagram of a memory controller in a first woken state.

FIG. 3A is a block diagram of a memory controller 115 in a first woken state. As mentioned above, the memory controller 115 may be woken up to service an event that requires a memory operation.

As shown in FIG. 3A, the memory controller includes, for example, four memory area circuitries designated $MC_0$, $MC_1$, $MC_2$ and $MC_3$. The four areas are associated with active areas for various performance states of the memory controller 115.

For example, $MC_0$ is associated with a first performance state. $MC_0$ and $MC_1$ are associated with a second performance state. $MC_0$, $MC_1$, and $MC_2$ are associated with a third performance state. $MC_0$, $MC_1$, $MC_2$ and $MC_3$ are associated with a fourth performance state.

Although four performance states are shown, it is understood that more or less than four performance states may be associated with a memory controller.

Each of the performance states are associated with parameters that determine how many of the states are to be awakened. For example, a first set of parameters may be associated with awakening one state, a second set of parameters being associated with awakening a second state, a third set of parameters associated with awakening a third state and a fourth set of parameters associated with awakening a fourth state.

As described above, the first set of parameters may require only the awakening of a first area of the memory controller. For example, the first set of parameters may require the memory controller only perform limited functioning, such as a memory read.

Accordingly, in the example shown in FIG. 3A, a first set of parameters associated with a wakeup event may be received by the SOC 101, which determines to wake up only $MC_0$ of the memory controller. The other areas of the memory controller 115 remain in a powered down state. That is, $MC_1$, $MC_2$ and $MC_3$ are kept powered down while only $MC_0$ is awakened.

The memory controller 115 can communicate with the memory 104 or with external memory 116 additionally to perform the memory event required. In this manner, the memory controller 115 can perform, for example, a memory read or a memory write to the memory 104. It should also be noted that the memory controller 115 may perform the operations with an external memory such as external memory 116 as mentioned above.

Figure 3B:
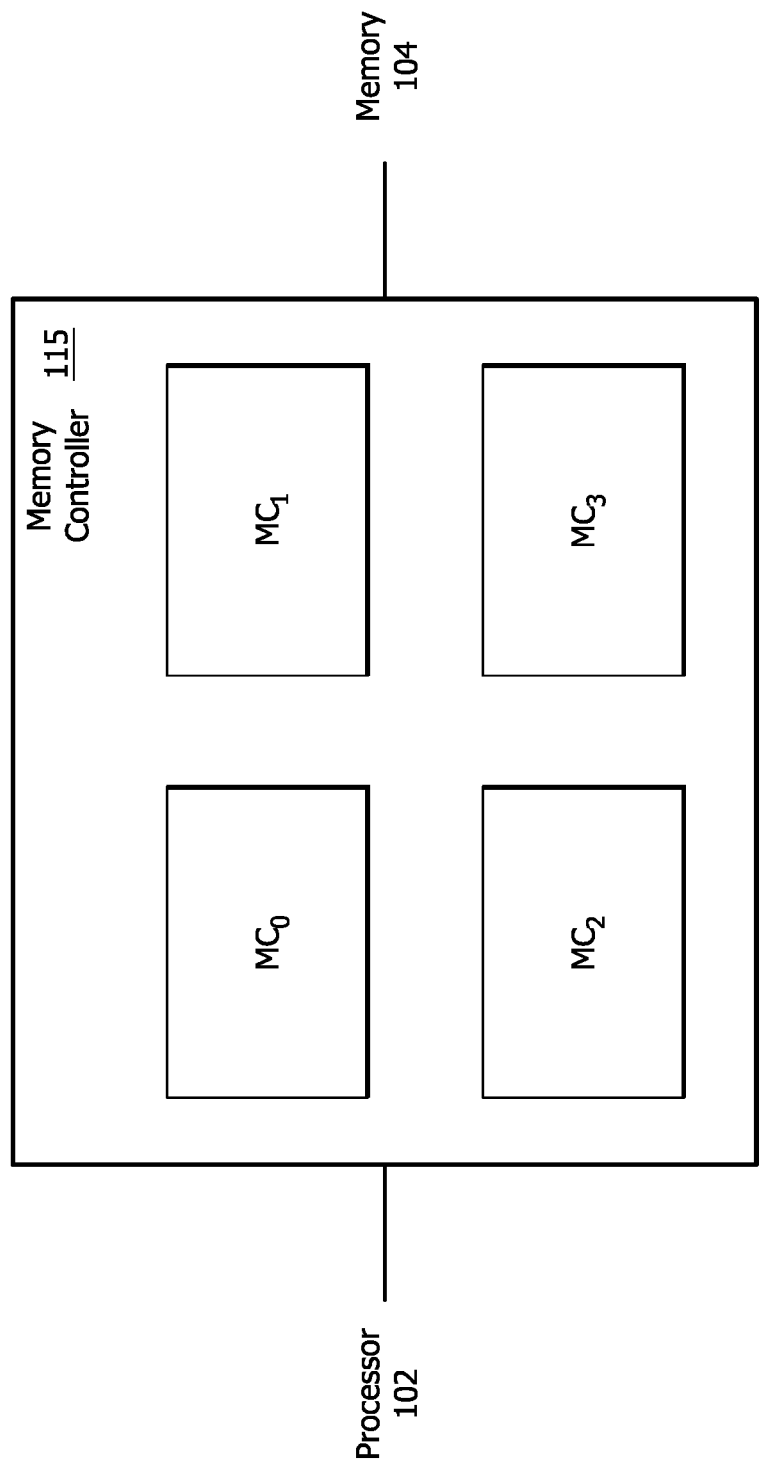
FIG. 3B is a block diagram of a memory controller in a second woken state.

FIG. 3B is a block diagram of a memory controller 115 in a second woken state. As mentioned above, the memory controller 115 may be woken up to service an event that requires a memory operation.

In the example shown in FIG. 3B, a second set of parameters associated with a wakeup event may be received by the SOC 101, which determines to wake up $MC_0$, $MC_1$, $MC_2$ and $MC_3$ of the memory controller. In this state, the entire memory controller 115 is woken up in order to service the memory event.

Again, the memory controller 115 is in communication with the memory 104 and also the external memory 116 to perform the memory operation.

In the examples depicted in FIGS. 3A and 3B, a vertical wakeup is in effect. That is, elements within a component of the SOC 101 are woken up in accordance with the wakeup event.

During this vertical wakeup, additional areas within the same component being awakened may or may not need to be awakened. For example, referring to the examples of FIGS. 3A and 3B, after waking a first area of the memory controller 115 to service the event, if it is determined that the event can be serviced by waking only that area, additional areas need not be awakened.

However, if additional areas are needed to be woken up to service the event, then they also are awakened. That is, if a second area is needed to be awakened, area $M_1$ is awoken. If a third area is needed to service the event, then area $M_2$ is also awakened. If the entire memory controller 115 is needed, then, as depicted in FIG. 3B, $MC_0$, $MC_1$, $MC_2$ and $MC_3$ of the memory controller 115 are awakened.

That is, should a memory operation be required that $MC_0$ cannot service by itself, $MC_1$-$MC_3$ are awakened to service the operation. For example, a large amount of data to be read or written from a memory area may not be serviceable by exclusively one area of the memory controller. In this case, additional areas of the memory controller are awakened in order to service the event.

Although examples of horizontal and vertical wakeups are described above, additionally a method of managing the power states associated with both a vertical and a horizontal wakeup are utilized. Accordingly, a method of managing the power states is described below.

Figure 4:
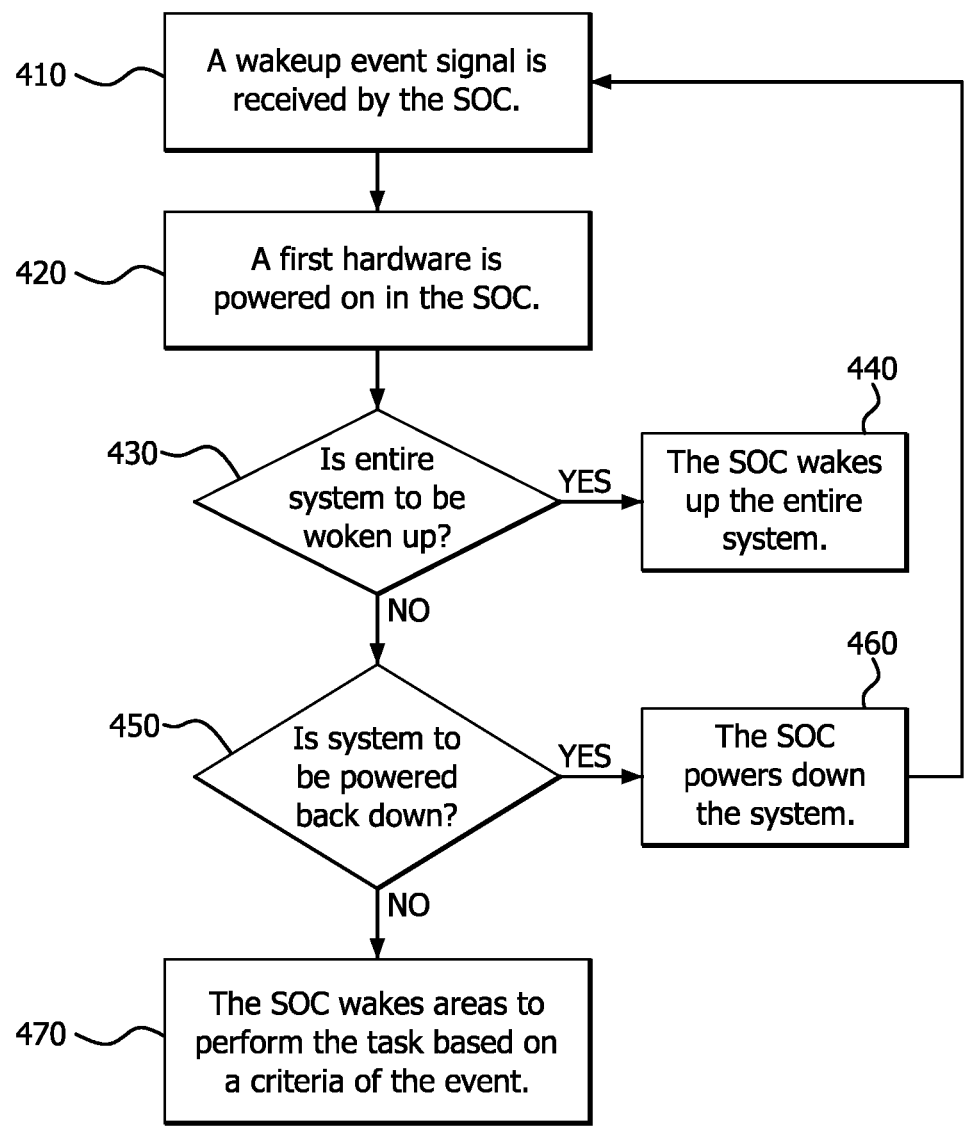
FIG. 4 is a flow diagram of an example method of managing power states in accordance with an embodiment.

FIG. 4 is a flow diagram of an example method 400 of managing power states in accordance with an embodiment. The example method 400 applies to both a vertical wakeup and a horizontal wakeup as described above.

In step 410, a wakeup event signal is received by the SOC 101. For example, a signal may be received from an input device or from a microcontroller on a device requiring an event to be serviced by the SOC 101. This signal may be received by any component of the SOC 101. For example, the processor 102 may receive the signal from the input device while the memory controller 115 may receive the signal from an event requiring memory operations. However, these components are not exclusively the components that may receive a signal triggering a wakeup.

The SOC 101 then powers up (or awakens) a first hardware in response to receiving the wakeup event (step 420). For example, processor 102 may be awakened to determine if the event can be serviced without waking up additional areas of the SOC 101.

If the entire system is to be awakened in order to service the event (step 430), then the SOC 101 wakes the entire system (step 440). For example, in some embodiments, additional metrics may track the history of the SOC 101 wake ups associated with specific event. The decision then to wakeup the entire SOC 101 is then made based on the history.

Although more detail is provided below regarding a predictive engine for wakeups, briefly, if a prediction of the components to wakeup based upon an event shows that the entire SOC 101 should be awakened to service that event, the entire SOC 101 is awakened.

If the entire system does not need to be awakened in step 430, then the SOC 101 determines whether the system can be powered back down (step 450). That is, if the event does not require additional areas to be powered up and is serviced by the minimal power up, the SOC 101 powers the system back down (step 460).

If the system is not to be powered back down (step 450), then the SOC 101 wakes areas to be powered up and awakened to perform the task event based on parameters associated with the event (step 470).

For example, in a graphics processing event, an entire GPU may not need to be awakened depending on the event. That is, the graphics processing may not require the processing power of all the cores of the GPU in order to service the event for a non-graphics intensive service event. In this case, the awakening of all the cores of the GPU is unnecessary and incurs additional power requirements that are not needed. Therefore, a single core of the GPU or multiple cores of the GPU may be powered up in order to service the event. This results in a power savings by not awakening all of the cores of the GPU.

Additionally, a timer parameter may be utilized to determine whether or not additional areas of the SOC 101 need to be awakened in order to service the event. That is, a timer may be utilized to track the service duration of the event. If the event cannot be serviced within a predetermined period of time, additional areas are deemed to be necessary to wake in order to service the event.

Accordingly, should the event exceed the predetermined period of time that the event could be serviced, the additional areas are awakened in the SOC 101 to service the event. For example, if additional cores of either the CPU or the GPU are required, those cores could be awakened and powered up in order to service the event.

Further, each component of the SOC 101 may include different criteria that determine whether or not to wake the component. Based upon the knowledge of the event criteria, the SOC 101 may determine which areas to wake in step 470.

For example, a new component being plugged into a universal serial bus (USB) port may be a criteria that indicates the display controller is to be awakened. In this manner, a potential user action could be requested on the display in order to determine a next step.

Additionally, for example, a USB flash drive being plugged in may require a determination by a user whether or not to copy files from the drive or any other action a user may deem desirable. As mentioned previously, a memory read or write event may be a criteria that determines to wake the memory controller 115 and memory areas (e.g. memory 104).

Accordingly, the components necessary to function to allow the user to determine a course of action when the USB flash drive is plugged in are awakened. For example, the display may be awakened to display to the user options for the user to select. And as mentioned above, if a copy operation is required, the areas of the memory controller 115 needed to perform the memory copy are awakened.

In addition, history of events and the components to be powered up can be tracked by the SOC 101. That is, certain events that occur may be predicted to require the awakening of particular components. When those predictions are correct, a counter can be incremented and stored to learn from regarding which components to awaken.

For example, if an event is predicted to require the awakening of the display controller and the awakening of the display controller services the event, the counter can be incremented. In this manner, machine learning is employed to determine to wake the display controller the next time for that event.

As mentioned above, the display controller is used to control a display (e.g., display 110). The display controller may include circuitry that may comprise any one or a combination of the following elements: firmware circuitry, processing circuitry configurable by software, or the like.

Accordingly, all or some of the display controller circuitry may powered up and awakened depending on the event. Other portions of the display controller circuitry not predicted to be needed may be kept powered down.

Utilizing the same example, if the waking of the display controller does not service the event, then the counter is decremented. The machine learning of the SOC 101 in this case learns that the prediction is less accurate based upon that event.

Accordingly, by incrementing or decrementing the counter, the machine learning that occurs improves the prediction. That is, the prediction becomes more refined and accurate as the counter continues to be incremented. In this manner, a more reliable prediction as to whether or not the awakened components will service the event can be realized. This can be implemented by setting a predefined threshold that can be utilized to compare the counter against.

For example, if the counter remains above the predefined threshold, the component awakened based upon the prediction continues to be awakened when that type of event is passed to the SOC 101. If the counter is below the threshold, the component awakened may be kept in a powered down state.

As described above, upon differing regions entering a power-down mode, power savings can be achieved, while also. Additionally, upon a wakeup event being received by the SOC 101, only areas that are needed to be awakened are powered up in order to use a minimal amount of power.

The power up can be a horizontal type awakening. That is, one or more components in the SOC 101 may be separately awakened without waking other components.

Additionally, the power up can be a vertical type awakening. In this type of awakening, areas within a single component may be powered up based upon the event to be serviced. For example, as above, different power states may of the memory controller 115 may be utilized to service different events. Some areas of the memory controller may not need to be powered up based upon the event and the task to be serviced.

The methods provided can be implemented in a general-purpose computer, a processor, or a processor core. Suitable processors include, by way of example, a general purpose processor, a purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors can be manufactured by configuring a manufacturing process using the results of processed hardware description language (HDL) instructions and other intermediary data including netlists (such instructions capable of being stored on a computer readable media). The results of such processing can be maskworks that are then used in a semiconductor manufacturing process to manufacture a processor which implements features of the disclosure. Further, although the methods and apparatus described above are described in the context of controlling and configuring PCIe links and ports, the methods and apparatus may be utilized in any interconnect protocol where link width is negotiated.

The methods or flow charts provided herein can be implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). For example, the methods described above may be implemented in the processor 102 or on any other processor in the computer system 100. Additionally, the methods described above may be performed in a controller, processor or circuitry within any component (e.g., a component of the SOC 101).

What is claimed is:

1. A method for managing power states in a computer system, comprising:
   tracking, by a first circuitry, history of an event, the tracking including incrementing a counter for successful prediction that a first circuitry services the event;
   responsive to the event, powering up the first circuitry to examine the history; and
   powering up a second circuitry of the computer system to service the event based on the examination indicating that the counter of the history of the event is above a threshold.

2. The method of claim 1, wherein the first circuitry and the second circuitry are resident in a same component of the computer system.

3. The method of claim 1, wherein the first circuitry is resident in a first component of the computer system and the second circuitry is resident in a second component of the computer system.

4. The method of claim 1, further comprising:
   updating the history of the event by measuring a success of servicing of the event by the computer system.

5. The method of claim 4, wherein the counter is incremented based upon a successful servicing of the event by the computer system.

6. The method of claim 5, wherein the second circuitry is determined based upon a value of the counter being equal to or greater than a predefined threshold.

7. The method of claim 5, wherein the counter is decremented based upon an unsuccessful servicing of the event by the computer system.

8. The method of claim 7 further comprising powering up additional circuitry for a same event measured as unsuccessful based upon a value of the counter being less than a predefined threshold.

9. An apparatus for managing power states in a computer system, comprising:

a first circuitry configured to track history of an event, the tracking including incrementing a counter for successful prediction that a second circuitry services the event, wherein the first circuitry is powered up responsive to the event to examine the history;

the second circuitry; and a processor operatively coupled with and in communication with the first circuitry and the second circuitry, the processor configured to:

responsive to the event, power up the first circuitry to examine the history, and power up the second circuitry to service the event based on the examination indicating that the counter of the history of the event is above a threshold.

10. The apparatus of claim 9, wherein the first circuitry and the second circuitry are resident in a same component of the computer system.

11. The apparatus of claim 9, wherein the first circuitry is resident in a first component of the computer system and the second circuitry is resident in a second component of the computer system.

12. The apparatus of claim 9, wherein the processor is further configured to:

update the history by measuring a success of servicing of the event by the computer system.

13. The apparatus of claim 12, wherein the counter is incremented based upon a successful servicing of the event by the computer system.

14. The apparatus of claim 13, wherein the second circuitry is determined based upon a value of the counter being equal to or greater than a predefined threshold.

15. The apparatus of claim 13, wherein the counter is decremented based upon an unsuccessful servicing of the event by the computer system.

16. The apparatus of claim 15, wherein the processor is further configured to:

power up additional circuitry for a same event measured as unsuccessful based upon a value of the counter being less than a predefined threshold.

17. A processor for managing power states in a computer system, the processor configured to:

track, by a first circuitry, history of an event, the tracking including incrementing a counter for successful prediction that a first circuitry services the event;

responsive to the event, power up the first circuitry of the computer system operatively coupled with and in communication with the processor, to examine the history; and power up a second circuitry of the computer system to service the event based on the examination indicating that the counter of the history of the event is above a threshold.

* * * * *